US008825037B2

(12) United States Patent
Solum

(10) Patent No.: US 8,825,037 B2
(45) Date of Patent: Sep. 2, 2014

(54) FM RADIO SYSTEM FOR DIGITAL AND ANALOG COMMUNICATIONS FOR HEARING ASSISTANCE DEVICES

(75) Inventor: Jeffrey Paul Solum, Deephaven, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 987 days.

(21) Appl. No.: 12/645,007

(22) Filed: Dec. 22, 2009

(65) Prior Publication Data

US 2011/0150255 A1 Jun. 23, 2011

(51) Int. Cl.
*H04M 3/00* (2006.01)

(52) U.S. Cl.
USPC ............................. 455/420; 381/60; 381/312

(58) Field of Classification Search
CPC .. H04R 25/70; H04R 2201/003; H04R 25/02; H04R 25/55; H04R 25/60; H04R 25/606
USPC ......................................................... 455/420
See application file for complete search history.

(56) References Cited

U.S. PATENT DOCUMENTS

| | | | |
|---|---|---|---|
| 5,020,076 A | 5/1991 | Cahill et al. | |
| 5,537,436 A * | 7/1996 | Bottoms et al. | 375/222 |
| 6,744,839 B1 * | 6/2004 | Tada et al. | 375/376 |
| 7,529,565 B2 | 5/2009 | Hilpisch et al. | |
| 8,222,965 B1 * | 7/2012 | Juneau et al. | 332/127 |
| 2005/0100182 A1 | 5/2005 | Sykes et al. | |
| 2005/0111682 A1 * | 5/2005 | Essabar et al. | 381/315 |
| 2006/0274747 A1 * | 12/2006 | Duchscher et al. | 370/389 |
| 2007/0269065 A1 * | 11/2007 | Kilsgaard | 381/315 |
| 2008/0009253 A1 * | 1/2008 | Callias et al. | 455/205 |
| 2008/0051918 A1 | 2/2008 | Tuttle et al. | |
| 2008/0233882 A1 | 9/2008 | Ibrahim | |
| 2008/0287083 A1 | 11/2008 | Payne, IV | |

FOREIGN PATENT DOCUMENTS

| | | |
|---|---|---|
| EP | 1624589 B9 | 7/2008 |
| WO | WO-03021827 A2 | 3/2003 |
| WO | WO-2006133158 A1 | 12/2006 |

OTHER PUBLICATIONS

"European Application Serial No. 10252177.0, Examination Notification Art. 94(3) mailed Aug. 2, 2013", 5 pgs.
"European Application Serial No. 10252177.0, Extended Search Report mailed Dec. 7, 2012", 7 pgs.
"European Application Serial No. 10252177.0, Response filed Jul. 3, 2013 to Extended European Search Report mailed Dec. 7, 2012", 20 pgs.
"European Application Serial No. 10252177.0, Examination Notification Art. 94(3) mailed Feb. 21, 2014", 5 pgs.
"European Application Serial No. 10252177.0, Response filed Feb. 11, 2014 to Office Action mailed Aug. 2, 2013", 8 pgs.

* cited by examiner

*Primary Examiner* — Ajibola Akinyemi
(74) *Attorney, Agent, or Firm* — Schwegman Lundberg & Woessner, P.A.

(57) ABSTRACT

The present disclosure relates to the wireless communication of analog and digital information using a modulator adapted to communicate analog information in an analog mode and to communicate digital information in a digital mode using frequency modulated transmissions. A demodulator adapted to receive the modulated information is provided. The present subject matter can be used with hearing assistance devices to communicate voice and data information. Applications of the system include communications with assistive listening devices, hearing aids, and other hearing assistance devices.

23 Claims, 3 Drawing Sheets

FM RADIO SYSTEM FOR DIGITAL AND ANALOG COMMUNICATIONS FOR HEARING ASSISTANCE DEVICES

FIELD OF THE INVENTION

The present subject matter relates generally to hearing assistance devices, including, but not limited to hearing aids, and in particular to an FM radio system for digital and analog communications for hearing assistance devices.

BACKGROUND

Modern hearing assistance devices typically include digital electronics to enhance the wearer's experience. In the specific case of hearing aids, current designs employ digital signal processors rich in features. Their functionality is further benefited from wireless communications. Some hearing devices, such as assistive listening devices, use analog FM transmissions for communications. Some devices may not be compatible with analog and digital communications and if they are, such devices typically include separate radio circuits which can be power hungry and take up a great deal of room in hearing assistance devices with limited circuit volume.

What is needed in the art is an improved radio system for analog and digital communications for hearing assistance devices.

SUMMARY

Disclosed herein, among other things, are methods and apparatus for hearing assistance devices, including, but not limited to hearing aids, and in particular to a radio system for analog and digital communications for hearing assistance devices.

The present disclosure relates to the wireless communication of analog and digital information using a modulator adapted to communicate analog information in an analog mode and to communicate digital information in a digital mode using frequency modulated transmissions. A demodulator adapted to receive the modulated information is provided. The present subject matter can be used with hearing assistance devices to communicate voice and data information.

In various embodiments the present subject matter provides a wireless communication system for wireless communications with a hearing assistance device, comprising: a modulator in a first device adapted to controllably provide frequency modulated signals from analog and digital information accessible to the first device; and a demodulator in the hearing assistance device adapted to demodulate the frequency modulated signals and to provide the analog and digital information to the hearing assistance device, wherein the frequency modulated signals are wirelessly transferred from the first device to the hearing assistance device. In various embodiments, the demodulator of the wireless communication system includes a mixer adapted to receive an input signal and a carrier recovery signal; an intermediate frequency filter adapted to receive an output of the mixer; a frequency modulation detector adapted to receive an output of the intermediate frequency filter; an output multiplexer adapted to provide its input signal to an analog output in an analog mode and to provide its input signal to a matched filter in a digital mode; and a timing and carrier recovery module adapted to provide a signal to an analog-to-digital converter in the data mode and to provide a signal to a carrier recovery mechanism for generating the carrier recovery signal for demodulating a digital FM input signal.

In various embodiments the present subject matter includes a method of wirelessly transmitting analog and digital data in a hearing assistance device, comprising: transmitting analog information with a modulator in the hearing assistance device in an analog mode using frequency modulation; and transmitting digital information using the modulator in a digital mode by frequency shift keying. Applications of the method include, but are not limited to, transmission of voice or other audio and data. Some digital data transferred includes, but is not limited to, control information, parameter information, program instructions, and diagnostic information. In various applications the information is received with a receiver programmed to adapt filter bandwidth for reception of different bandwidth information.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates generally to hearing assistance devices, including, but not limited to hearing aids, and in particular to a radio system for analog and digital communications for hearing assistance device applications.

Figure 1:
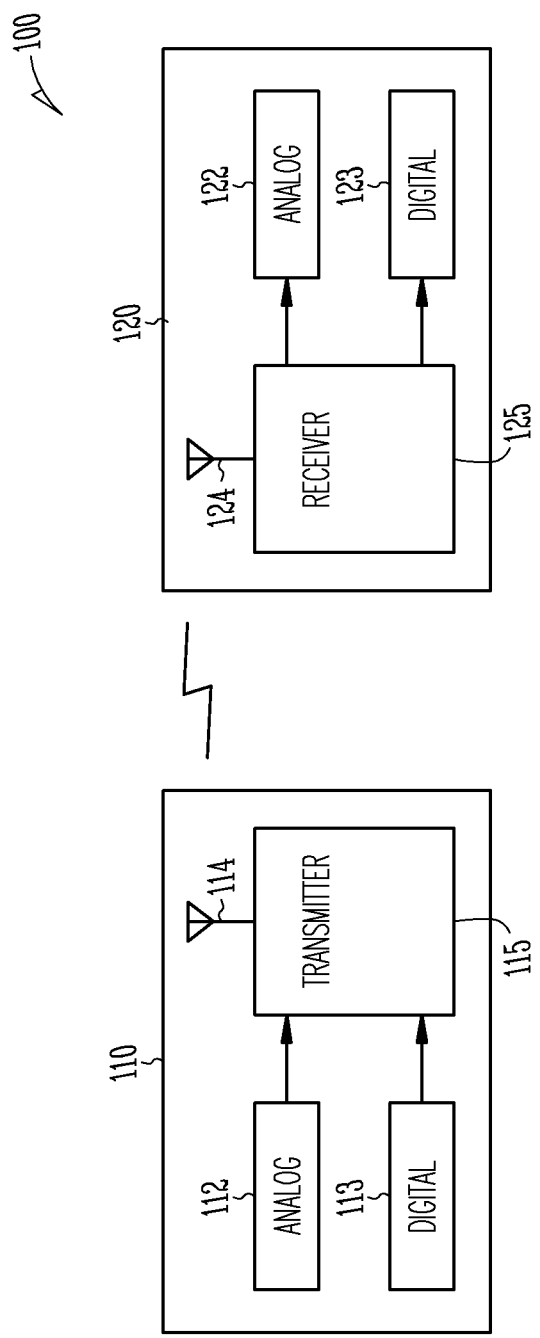
FIG. 1 is a block diagram of a radio system for analog and digital communications, according to one embodiment of the present subject matter.

FIG. 1 is a block diagram of a radio system 100 for analog and digital communications, according to one embodiment of the present subject matter. A device 110 communicates analog and digital information wirelessly with device 120. Device 110 is adapted to modulate and transmit analog information from analog source 112 and digital information from digital source 113 using modulator 115 and antenna 114 to device 120. Device 120 demodulates the wireless information using antenna 124 and demodulator 125 and provides analog information to analog electronics 122 and digital information to digital electronics 123. In various applications device 110 is a hearing assistance device, such as a hearing aid. In various applications, devices 110 and 120 are hearing assistance devices, such as hearing aids. In various applications, device 110 is a wireless audio controller and device 120 is a hearing assistance device. Some examples of wireless audio controllers are found in U.S. Patent Application Publication 2006/0274747, titled: COMMUNICATION SYSTEM FOR WIRELESS AUDIO DEVICES, and PCT Application Publication WO 2006/133158, titled: COMMUNICATION SYSTEM FOR WIRELESS AUDIO DEVICES, which are both hereby incorporated by reference in their entirety. Devices 110 and 120 can be any wireless devices, and the examples provided herein are intended to demonstrate the present subject matter, but not to limit it to the examples provided herein.

Figure 2:
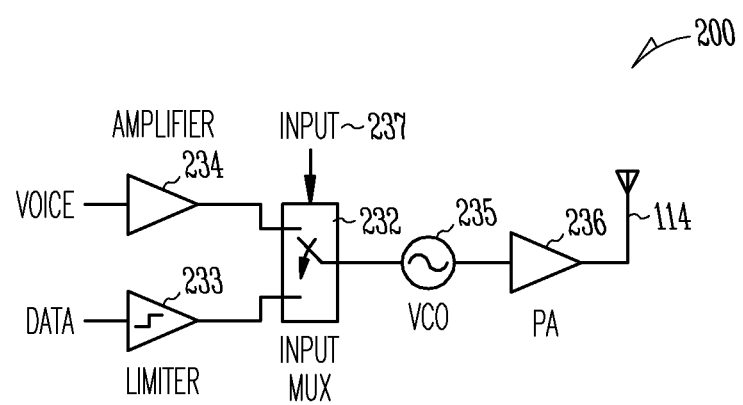
FIG. 2 is a block diagram of a FM modulator system and an antenna, according to one embodiment of the present subject matter.

FIG. 2 is a block diagram of a FM modulator system 200 and an antenna 114, according to one embodiment of the present subject matter. In various applications the analog and digital information sources can vary. The example provided by FIG. 2 is that the analog information source is voice information and the digital information source is data. The analog information (e.g., voice) is provided to analog multiplexer 232 via amplifier 234. The digital information (e.g., data) is provided to analog multiplexer 232 via limiter 233. The input multiplexer 232 selects a signal to apply to voltage controlled oscillator (VCO) 235 based on the input 237 to the input multiplexer 232. VCO 235 provides a frequency modulated signal based on the input signal from input multiplexer 232. The output of the VCO 235 is optionally amplified by power amplifier (PA) 236 and provided to antenna 114. The resulting output is an analog FM signal when the analog input is transmitted via the input multiplexer 232 and a digital FM signal when the digital input is transmitted via the input multiplexer 232. Thus, the resulting FM output is analog or digital as selected by the system. In discussion of digital radio, sometimes the term "numerically controlled oscillator" or "NCO" is used instead of "VCO." It is understood that the organization and inputs and types of circuits and/or processing may vary without departing from the scope of the present subject matter.

The output of the modulator is applied to input multiplexer 237 (input MUX) for the purpose of increasing the output power of the signal. In various embodiments, the power amplifier 236 is selected only when the input is analog since the link budget for a narrow band FM analog signal requires a greater signal to noise ratio at the receiver for the reception of high fidelity voice signals compared with the data transmission for digital information. In various embodiments, the gain of the power amplifier is adjusted as needed by the system.

The present FM modulator can be used for the transmission of both analog and digital signals. Analog signals may be employed for narrow-band voice transmission and reception between two hearing instruments for bi-cross operation or acoustic directional beam forming, as well as audio communication between a hearing instrument and another communication device. Data transmission may be used for telemetry, data logging, and synchronization of parameters. In order to achieve this, the FM modulator in the data mode is modulated with a hard limiting device such as a 1-bit digital-to-analog converter. The frequency deviation of the FM modulator is set to be sufficient to send a certain data symbol rate through the channel.

In various embodiments, in the analog modulation mode the hard limiter on the transmitter is replaced by an amplifier with sufficient gain to send a signal of sufficient bandwidth to carry analog voice signals over the FM channel. The frequency discriminator in this case can run in an "analog mode" with the frequency discriminator output proportional to the audio amplitude. The advantage of this system is that the FM radio used for data modulation can also be used for analog modulation.

The signal to noise ratio (SNR) requirements for reasonably low bit error rates in the data recovery mode are lower than the SNR requirements for good quality analog FM sufficient for voice communication. This is mitigated by increasing the power of the FM transmitter when it is used for transmitting voice signals. One advantage of using FM is that the transmit power amplifier can operate in a non-linear mode such as class C since the output signal is a constant envelope and no information is contained in the signal amplitude.

Figure 3:
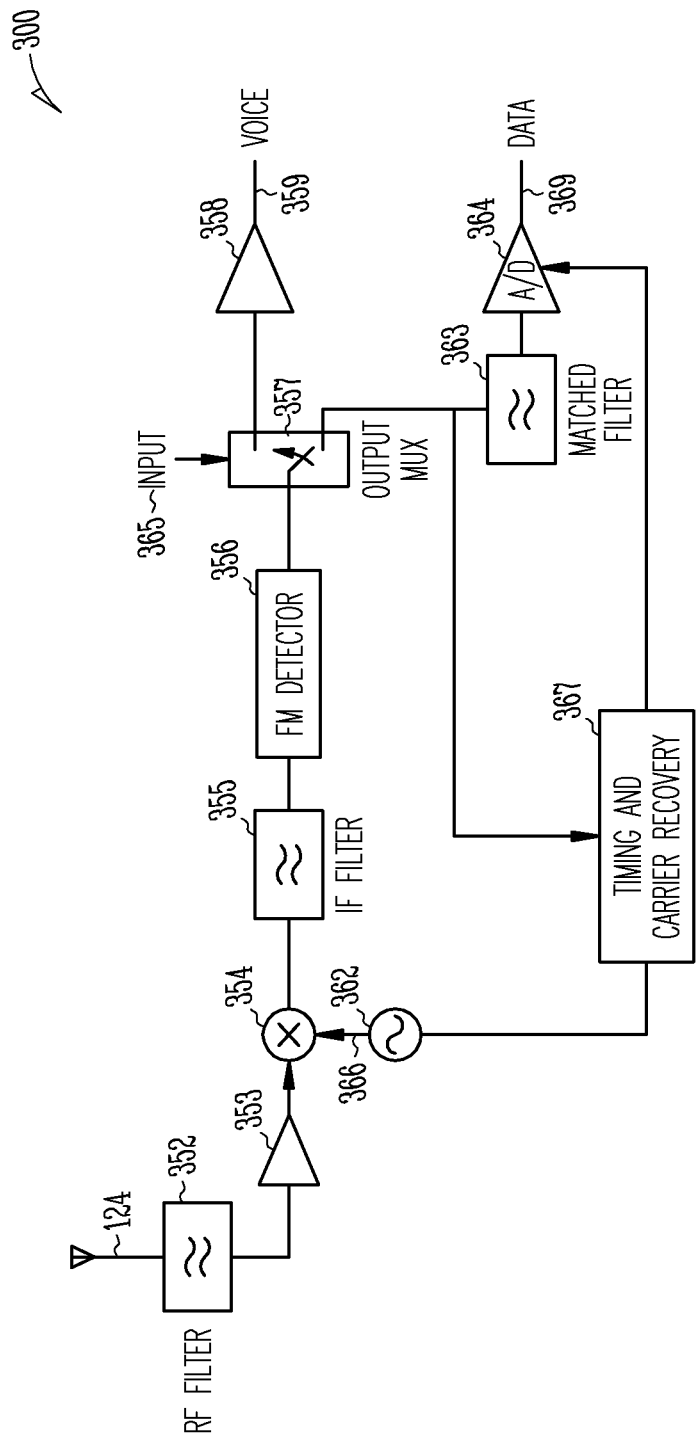
FIG. 3 is a block diagram of a FM demodulator system and an antenna, according to one embodiment of the present subject matter.

FIG. 3 is a block diagram of a FM demodulator system 300 and an antenna 124, according to one embodiment of the present subject matter. Radio signals are received by antenna 124 and passed through RF filter 352 and then to amplifier 353. The output of amplifier 353 is fed to mixer 354 which mixes that signal and a VCO signal 366 produced by voltage controlled oscillator (VCO) 362. The VCO signal 366 is a carrier recover signal for demodulating a digital FM input signal. In discussing digital radio, sometimes the terminology "numerically controlled oscillator" or "NCO" is used. It is understood that other carrier recovery mechanisms may be used without departing from the scope of the present subject matter. The loop that generates the output signals includes an intermediate frequency filter 355, a frequency modulation (FM) detector 356, an output multiplexer 357 having an input 365, a matched filter 363, a timing and carrier recovery module 367 as shown in FIG. 3. The timing and carrier recovery module 367 provides an output that drives VCO 362 and another output that provides a signal to analog-to-digital converter 364. The digital output 369 (e.g., data) is provided when the output multiplexer 357 has an input which directs the signals to the matched filter 363. The analog output 359 (e.g., voice) is output from amplifier 358 when the output multiplexer 357 is switched to output its signal to amplifier 358.

In the digital mode, the signal for data detection is passed through a matched filter 363 and a timing and carrier recovery module 367 for better reception of non-coherent frequency shift keying (FSK) modulated data. In the analog mode, the output multiplexer 357 selects an analog output from the FM detector 356 for the purpose of receiving analog (e.g., voice) information.

The FM frequency discriminator on the receiving end is a data recovery device with appropriate signal processing so as to recover the symbols sent by the transmitting station. This is accomplished by adding a symbol timing and carrier recovery circuit to the receiver and applying the output to a 1 bit A/D converter.

In various embodiments the digital data mode is the default mode and the system switches to analog mode when needed to transfer analog information. In various embodiments the system uses a detection scheme via the data mode to determine when the analog mode is enabled. In various embodiments the analog mode is the default mode. In various embodiments the system transmits data in pauses in the analog mode. In various embodiments a predetermined signaling is used to switch between the analog mode and the digital mode. In various embodiments signals from a transmitting device are encoded to determine whether a receiver should be in the analog mode or the digital mode. Other variations are possible without departing from the scope of the present subject matter.

In various embodiments, timing recovery involves various detectors such as an early/late gate to determine the optimum sample time to sample the matched filter(s). In various embodiments, carrier recovery is accomplished by a coarse adjustment while receiving a zero balanced preamble and fine adjustment during data reception of zero balanced data. This is done by adjusting either a DC offset at the FM detector or by making an adjustment to a VCO (voltage controlled oscillator) or NCO (numerically controlled oscillator).

The present subject matter provides various communications, including, but not limited to, device-to-device communications, ear-to-ear communications, or ear-to-remote-device communications. It is understood that these communications can be unidirectional, bidirectional, or combinations of both. Such communications can also include far field communications (e.g., radio frequency communications), or combinations of near field (e.g., inductive link using substantially the magnetic field) and far field communications.

In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, uch connections include all past and present link protocols. It is also contemplated that future versions of these protocols and new future standards may be employed without departing from the scope of the present subject matter.

In various applications the system allows an assistive listening device (ALD) to communicate with another device. ALDs that use narrow band FM analog transmission can be received, along with digital signals, by devices using the present subject matter. In various embodiments the present system can perform bandwidth adaptation to adjust for the information received. For example, in some embodiments the system can adapt the bandwidth to a higher one by adjusting the IF and matched filters during the data mode. The data mode can be a digital mode selected and adapted when a low data rate signal is received.

In various embodiments, the system signals a data rate that provides the data rate to the receiving device. The IF filter can be adapted to receive a higher data rate to accommodate the incoming data stream.

In various embodiments a narrow band voiceband signal and a narrowband digital signal can be received. The IF filter is adapted to open the bandwidth to receive a higher bandwidth signal.

In various embodiments a protocol is used, such as the protocol described in U.S. Patent Application Publication 2006/0274747, entitled: COMMUNICATION SYSTEM FOR WIRELESS DEVICES, and PCT Application Publication WO 2006/133158, titled: COMMUNICATION SYSTEM FOR WIRELESS AUDIO DEVICES, which are both hereby incorporated by reference in their entirety. In various embodiments, a protocol is used such as the protocol in U.S. Pat. No. 7,529,565, which is hereby incorporated by reference in its entirety. Other protocols may be used without departing from the scope of the present subject matter.

It is understood that variations in communications protocols, antenna configurations, and combinations of components may be employed without departing from the scope of the present subject matter. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

The present subject matter is demonstrated as a receiver in one device and a transmitter in a second device. It is understood that the demodulator and modulator may be used within the same device to provide a transceiver function within the scope of the present subject matter. For example, in various embodiments a hearing assistance device includes a modulator and a demodulator according to the teachings provided herein.

In various embodiments, the analog information demonstrated by the system includes voice information. However, it is understood that any analog information may be transmitted by the system and that the analog information is not so limited. Other forms of analog information may be transmitted without departing from the scope of the present subject matter. In various embodiments, the digital information demonstrated by the system is data. In various embodiments, such digital information includes, but is not limited to, one or more of: data, control information, parameter information, program instructions, and diagnostic information. Other types of digital information may be transmitted without departing from the scope of the present subject matter.

The present subject matter provides a modulator and demodulator to perform digital and analog communications. This approach provides economy of space in the design and economy of power dissipation by the circuits by avoidance of redundant circuitry for communications of the analog and digital information.

The present subject matter can be used for a variety of hearing assistance devices, including but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. Such devices are also known as receiver-in-the-canal (RIC) or receiver-in-the-ear (RITE) hearing instruments. It is understood that other hearing assistance devices not expressly stated herein may fall within the scope of the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A wireless communication system for wireless communications with a hearing assistance device, comprising:
   a modulator in a first device, the modulator including an input analog multiplexer configured to receive analog information and digital information, the digital information received via a limiter, and the input analog multiplexer configured to selectably pass the analog information or the digital information, wherein the frequency modulator is adapted to controllably provide frequency modulated signals from the analog and digital information accessible to the first device; and
   a demodulator in the hearing assistance device adapted to demodulate the frequency modulated signals and to provide the analog and digital information to the hearing assistance device,
   wherein the frequency modulated signals are wirelessly transferred from the first device to the hearing assistance device and wherein the hearing assistance device is configured for reception of analog and digital signals.

2. The wireless communication system of claim 1, wherein the digital information is transferred using frequency shift keying (FSK).

3. The wireless communication system of claim 1, wherein the input multiplexer is configured to selectably pass the analog information or the digital information to a voltage controlled oscillator.

4. The wireless communication system of claim 3, wherein the voltage controlled oscillator is selectably connected to a power amplifier during transmission of the analog information.

5. The wireless communication system of claim 1, wherein the demodulator comprises:
   a mixer adapted to receive an input signal and a carrier recovery signal;
   an intermediate frequency filter adapted to receive an output of the mixer;
   a frequency modulation detector adapted to receive an output of the intermediate frequency filter;
   an output multiplexer adapted to provide its input signal to an analog output in an analog mode and to provide its input signal to a matched filter in a digital mode; and
   a timing and carrier recovery module adapted to provide a signal to an analog-to-digital converter in the data mode and to provide a signal to a carrier recovery mechanism for generating the carrier recovery signal for demodulating a digital FM input signal.

6. The wireless communication system of claim 5, wherein the input multiplexer is configured to selectably pass the analog information or the digital information to a voltage controlled oscillator or a numerically controlled oscillator for an output.

7. The wireless communication system of claim 6, wherein the output is amplified by a power amplifier during transmission of the analog information.

8. The wireless communication system of claim 1, wherein the carrier recovery mechanism is a voltage controlled oscillator and the carrier recovery signal is an output of the voltage controlled oscillator.

9. The wireless communication system of claim 1, wherein the carrier recovery mechanism is a numerically controlled oscillator and the carrier recovery signal is an output of the numerically controlled oscillator.

10. The wireless communication system of claim 1, wherein the modulator is disposed within a second hearing assistance device.

11. The wireless communication system of claim 1, wherein the modulator is disposed within a wireless audio controller.

12. The wireless communication system of claim 1, wherein the hearing assistance device includes a modulator adapted to controllably provide frequency modulated signals from analog and digital information accessible to the hearing assistance device.

13. A method of wirelessly transmitting analog and digital data in a hearing assistance device, comprising:
   transmitting analog information with a modulator in the hearing assistance device in an analog mode using frequency modulation; and
   transmitting digital information using the modulator in a digital mode by frequency shift keying,
   wherein the modulator includes an input analog multiplexer configured to receive analog information and digital information, the digital information received via a limiter, and the input analog multiplexer configured to selectably pass the analog information or the digital information, and
   wherein the hearing assistance device is configured for reception of analog and digital signals.

14. The method of claim 13, wherein the analog information includes voice or other audio information and the digital information includes data.

15. The method of claim 13, wherein the digital information includes control information.

16. The method of claim 13, wherein the digital information includes parameter information.

17. The method of claim 13, wherein the digital information includes program instructions.

18. The method of claim 13, wherein the digital information includes diagnostic information.

19. The method of claim 13, wherein transmitting analog information includes amplifying audio information such as voice and other acoustic information.

20. The method of claim 13, further comprising receiving the analog information and digital information with a receiver programmed to adapt filter bandwidth for reception of different bandwidth information.

21. A wireless communication system for wireless communications with a hearing assistance device, comprising:
   a modulator in a first device adapted to controllably provide frequency modulated signals from analog and digital information accessible to the first device; and
   a demodulator in the hearing assistance device adapted to demodulate the frequency modulated signals and to provide the analog and digital information to the hearing assistance device,
   wherein the frequency modulated signals are wirelessly transferred from the first device to the hearing assistance device, and
   wherein the demodulator comprises:
      a mixer adapted to receive an input signal and a carrier recovery signal;
      an intermediate frequency filter adapted to receive an output of the mixer;
      a frequency modulation detector adapted to receive an output of the intermediate frequency filter;
      an output multiplexer adapted to provide its input signal to an analog output in an analog mode and to provide its input signal to a matched filter in a digital mode; and a timing and carrier recovery module adapted to provide a signal to an analog-to-digital converter in the data mode and to provide a signal to a carrier recovery mechanism for generating the carrier recovery signal for demodulating a digital FM input signal.

22. The wireless communication system of claim 21, wherein the modulator comprises an input multiplexer connected to receive the analog and digital information and to selectably pass the analog information or the digital information to a voltage controlled oscillator or a numerically controlled oscillator for an output.

23. The wireless communication system of claim 22, wherein the output is amplified by a power amplifier during transmission of the analog information.

* * * * *

UNITED STATES PATENT AND TRADEMARK OFFICE
CERTIFICATE OF CORRECTION

PATENT NO. : 8,825,037 B2
APPLICATION NO. : 12/645007
DATED : September 2, 2014
INVENTOR(S) : Solum Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this
Seventeenth Day of November, 2015

Michelle K. Lee
*Director of the United States Patent and Trademark Office*